United States Patent
Fukumoto et al.

(10) Patent No.: US 7,276,305 B2
(45) Date of Patent: Oct. 2, 2007

(54) METHOD OF OPERATING FUEL CELL

(75) Inventors: Hisatoshi Fukumoto, Tokyo (JP); Hironori Kuriki, Tokyo (JP); Takashi Nishimura, Tokyo (JP); Shuichi Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/344,594

(22) Filed: Feb. 1, 2006

(65) Prior Publication Data
US 2006/0183007 A1 Aug. 17, 2006

(30) Foreign Application Priority Data
Feb. 17, 2005 (JP) ............................ P2005-040492

(51) Int. Cl.
*H01M 8/04* (2006.01)

(52) U.S. Cl. .............................. 429/13; 429/12; 429/30

(58) Field of Classification Search ................ 429/12, 429/13, 34, 30
See application file for complete search history.

(56) References Cited

U.S. PATENT DOCUMENTS

2005/0271911 A1* 12/2005 Kuriki et al. ................. 429/13

FOREIGN PATENT DOCUMENTS

| JP | 2003-115318 | 4/2003 |
|----|-------------|--------|
| JP | 2005-268091 | 9/2005 |

OTHER PUBLICATIONS

Uribe, F. et al.; "A study of polymer electrolyte fuel cell performance at high voltages. Dependence on cathode catalyst layer composition and on voltage conditioning", *Electrochimica Acta*, 47 (2002) pp. 3799-3806.

* cited by examiner

*Primary Examiner*—Patrick Joseph Ryan
*Assistant Examiner*—Monique Wills
(74) *Attorney, Agent, or Firm*—Leydig, Voit & Mayer, Ltd.

(57) ABSTRACT

A method of operating a fuel cell including a fuel electrode, an oxidant electrode, and an electrolyte layer having hydrogen ion conductivity sandwiched between the fuel electrode and the oxidant electrode, so that the fuel cell generates electricity as a result of an electrochemical reaction between a fuel and an oxidant. Each time the fuel cell is started from a non-operating condition, the fuel is supplied to the fuel electrode with the fuel electrode and the oxidant electrode electrically interconnected to produce hydrogen at the oxidant electrode by provoking electrochemical reactions expressed by the chemical equations $H_2 \rightarrow 2H_+ + 2e^-$ and $2H_+ + 2e^- \rightarrow H_2$ at the fuel electrode and the oxidant electrode, respectively, reducing oxides on the oxidant electrode, using the hydrogen produced at the oxidant electrode. Then, the oxidant is supplied to the oxidant electrode to begin normal continuing operation of the fuel cell.

6 Claims, 1 Drawing Sheet

METHOD OF OPERATING FUEL CELL

BACKGROUND OF THE INVENTION

1. Field of the Invention

The present invention relates to a method of operating a fuel cell used in an electric vehicle or a stationary power generating system, for example.

2. Description of the Background Art

A fuel cell is a device produced by sandwiching a layer of an electrolyte between two electrodes (oxidant and fuel electrodes). The fuel cell converts chemical energy directly into electric energy by supplying a fuel to one of the electrodes and an oxidant to the other, thereby producing an electrochemical reaction between the fuel and the oxidant. There are several types of fuel cells. Today, solid polymer electrolyte fuel cells using a solid polymer electrolyte membrane having proton conductivity as the electrolyte layer are watched with keen interest as fuel cells suited for producing high output power.

Main constituent elements of a solid polymer fuel cell are an anode and a cathode which together constitute two facing electrodes, separators in which fuel gas or oxidant gas channels (grooves) are formed, and a polymer electrolyte membrane placed between the two electrodes. The anode, the polymer electrolyte membrane and the cathode are joined together to form a so-called membrane electrode assembly (MEA). Each electrode typically includes an electrode substrate (referred to also as a gas diffusion layer) made up of an electrically conductive porous material, such as carbon fiber, and a catalyst layer including a solid electrolyte component. The two electrodes and the polymer electrolyte membrane are joined into a single structure by hot pressing or a like method. A gas sealing layer is formed on an outer area of each electrode so that the gas supplied to an electrode surface would not leak to the exterior. Generally, the gas sealing layer is made of a heat-resistant plastic, such as polytetrafluoroethylene (PTFE).

A process of starting up the fuel cell is as follows. The oxidant, such as an oxygen-containing gas (e.g., air), is fed through an oxidant inlet formed in one of the separators and supplied to the oxidant electrode through the oxidant channels. On the other hand, a hydrogen-containing gas used as the fuel is fed through a fuel inlet formed in the other separator and supplied to the fuel electrode through the fuel channels. When the fuel cell is warmed up to a specific temperature and the oxidant and fuel electrodes are connected via an external circuit, a reaction expressed by chemical equation (1) below occurs on the oxidant electrode side and unreacted gas and water are discharged through the fluid channels and an air outlet:

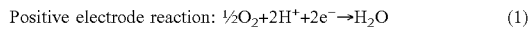

$$\text{Positive electrode reaction: } \tfrac{1}{2}O_2 + 2H^+ + 2e^- \rightarrow H_2O \quad (1)$$

whereas a reaction expressed by chemical equation (2) below occurs on the fuel electrode side and unreacted gas is discharged through the other fluid channels and a fuel outlet:

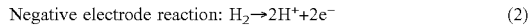

$$\text{Negative electrode reaction: } H_2 \rightarrow 2H^+ + 2e^- \quad (2)$$

Electrons produced by the aforementioned reactions flow from the fuel cell into the external circuit through the separator.

In a case where air (oxygen) is used as the oxidant, the oxidant (positive) electrode has a potential of 1.23 V (theoretical value) under no-load conditions while the potential of the oxidant electrode drops down to 0.7 to 0.8 V under normal operating conditions due to internal resistance of the fuel cell.

A phenomenon observed in the fuel cell thus structured is a decrease in catalytic activity occurring with the lapse of time when the fuel cell is operated at a relatively high electrode potential of 0.7 V or above. This phenomenon is considered to occur as oxides deposit on a surface of platinum (Pt) used in the oxidant electrode and an effective area of the active Pt surface decreases as a result of an increase in oxide-covered areas, thereby causing deterioration of fuel cell performance. It is therefore important to remove oxide deposits for maintaining normal fuel cell performance.

As an example, a non-patent document titled "A Study of Polymer Electrolyte Fuel Cell Performance at High Voltages. Dependence on Cathode Catalyst Layer Composition and on Voltage Conditioning" cowritten by Francisco A. Uribe and T. A. Zawodzinski, Electrochimica Acta, 47(2002) pp. 3799-3809 mentions that the authors studied a method of removing the oxides deposited on the Pt surface through a reduction process caused by lowering the potential of the oxidant electrode down to 0.2 V by producing a large impulsive current during fuel cell operation and found that this method worked effectively.

Another approach to the removal of oxide deposits on the Pt surface is a "cathode reconditioning process" described in Japanese Patent Application Publication No. 2003-115318, in which a fuel cell is operated to produce a current larger than produced under normal operating conditions such that the potential of the oxidant electrode drops down to 0.3 to 0.6 V at startup, during normal operation and stopping of the fuel cell.

Although the aforementioned approaches of the non-patent document and Japanese Patent Application Publication are effective for reconditioning the oxidant electrode by removing the oxides deposited thereon, it is necessary to flow a larger current than under normal operating conditions. To meet this requirement, wirings, an AC-DC converter, a circuit breaker and other components of a fuel cell system must have higher power ratings than would be necessary under normal operating conditions, resulting in an increase in an increased equipment size and a higher manufacturing cost.

SUMMARY OF THE INVENTION

Intended to provide a solution to the aforementioned problems of the prior art, the invention has as an object the provision of a simple and inexpensive method of starting up a fuel cell power generating system by removing oxides deposited on an oxidant electrode of a fuel cell to restore normal performance thereof without the need for increasing power ratings of system components.

The invention provides a novel method of operating a fuel cell which includes a fuel electrode to which a fuel is supplied, an oxidant electrode to which an oxidant is supplied, a layer of an electrolyte having hydrogen ion conductivity sandwiched between the fuel electrode and the oxidant electrode, fuel channels for supplying the fuel to the fuel electrode, and oxidant channels for supplying the oxidant to the oxidant electrode. The fuel cell operating method includes the steps of supplying the fuel to the fuel electrode with the fuel electrode and the oxidant electrode electrically interconnected to produce hydrogen at the oxidant electrode by provoking electrochemical reactions expressed by the chemical equations $H_2 \rightarrow 2H^+ + 2e^-$ and $2H^+ + 2e^- \rightarrow H_2$ at the fuel electrode and the oxidant electrode, respectively, for performing an oxidant electrode reduction process using the hydrogen produced at the oxidant electrode and thereby reducing oxides deposited on the oxidant electrode at startup from non-operating conditions, and then supplying the oxidant to the oxidant electrode to begin normal operation of the fuel cell.

This method of operating the fuel cell of the invention makes it possible to recondition the oxidant electrode by reducing the oxides deposited on the oxidant electrode and restore normal performance of the fuel cell in a simple and inexpensive way, thereby permitting restart of a fuel cell power generating system without the need for increasing power ratings of system components.

The fuel cell operating method of the invention is useful for operating fuel cells used in electric vehicles or stationary power generating systems, for example.

These and other objects, features and advantages of the invention will become more apparent upon reading the following detailed description along with the accompanying drawings.

DETAILED DESCRIPTION OF THE PREFERRED EMBODIMENT OF THE INVENTION

Figure 1:
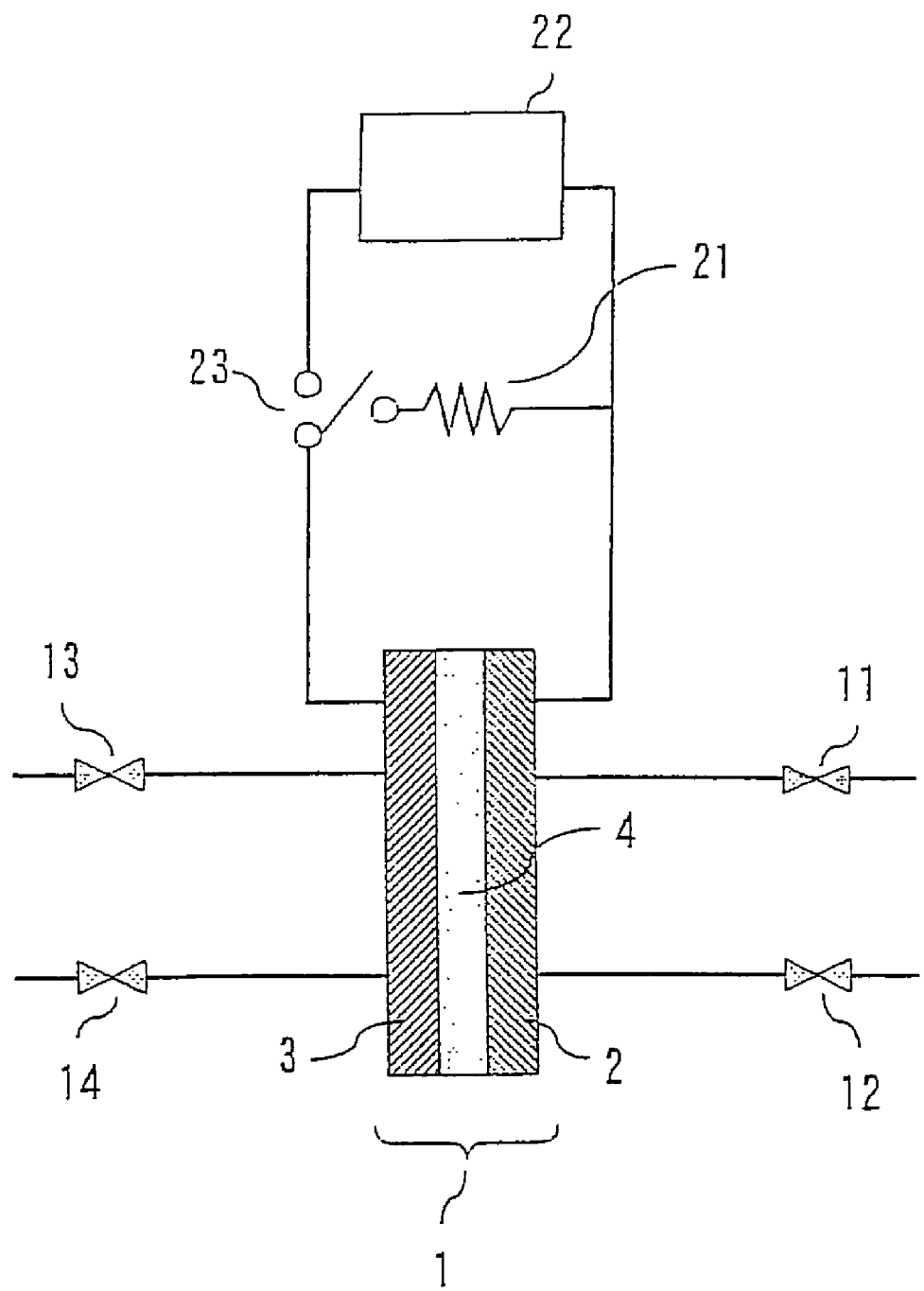
FIG. 1 is a block diagram of a fuel cell power generating system to which a method of operating a fuel cell according to a preferred embodiment of the invention is applied.

The invention is now described in detail with reference to a preferred embodiment thereof.

FIG. 1 is a block diagram of a solid polymer fuel cell power generating system, mainly showing a single fuel cell 1 and electrical and gas-carrying circuits connected to the fuel cell 1, to which a method of operating a fuel cell according to the preferred embodiment of the invention is applied. The solid polymer fuel cell power generating system includes the single fuel cell 1 formed of a fuel electrode 2, an oxidant electrode 3 disposed to face the fuel cell 1, an electrolytic layer 4 sandwiched between the fuel electrode 2 and the oxidant electrode 3, or a fuel cell stack formed of a plurality of such single fuel cells 1 stacked together. The solid polymer fuel cell power generating system also includes the gas-carrying circuits which are provided with a fuel inlet valve 11, a fuel outlet valve 12, an oxidant inlet valve 13 and an oxidant outlet valve 14, as well as the electrical circuit including an internal resistive load 21 and a switch 23 for selectively connecting the fuel cell 1 to the resistive load 21 or an external load 22.

The electrolytic layer 4 may be made of a membrane of an electrolyte, such as perfluorocarbon sulfonic acid, having hydrogen ion (proton) conductivity and an ability to interrupt passage of reaction fluid ($H_2O$) produced by reactions at both electrodes 2, 3. Although not illustrated, each of the two electrodes 2, 3 includes, from the side nearest to the electrolytic layer 4, a catalyst layer made of a mixture of a catalyst and an electrolyte, the catalyst being particles of noble metal or grains of carbon block with fine noble metal particles dispersed thereon, a so-called gas diffusion layer made of an electrically conductive porous material, such as carbon fiber, and a current collector (referred to also as a separator) in which fluid channels are formed for feeding one of two reacting gaseous fluids (fuel and oxidant). Most often used as the noble metal catalyst is platinum or an alloy of platinum. The separator is preferably made of a corrosion-resistant carbon plate in which the fluid channels for feeding the reactant gas are formed.

The fuel used in the fuel cell power generating system is a substance containing one or more hydrogen atoms therein, such as hydrogen gas, a hydrogen-containing gas obtained by reforming hydrocarbon, for instance, or alcohol. The oxidant is a substance, such as air or oxygen, which can oxidize the fuel. Under normal operating conditions, electrons produced at the fuel electrode 2 flow through the external load 22 or the internal resistive load 21, whichever selected by the switch 23, and into the oxidant electrode 3.

Operation of the fuel cell power generating system is now described in detail. While the fuel cell power generating system is under non-operating conditions, various kinds of gaseous fluids, such as hydrogen or other fuel, the oxidant like air and/or inert gas like nitrogen, may remain within the fuel electrode 2 or the oxidant electrode 3 of the fuel cell 1 depending on a system stopping method. If the fuel cell power generating system is not operated for an extended period of time, external air may intrude into the fuel cell 1, so that the interior of the fuel cell 1 may be predominated by an atmosphere of ambient air. When the fuel cell power generating system is started under such conditions, the fuel inlet valve 11 and the fuel outlet valve 12 are opened to supply the fuel to the fuel cell 1 at first. If air is retained within the single fuel cell 1, there is a possibility that the fuel and oxygen contained in the air will directly react with each other, or corrosion will occur as a result of local cell reaction. It is possible to prevent direct reaction between the fuel and oxygen and corrosion by the local cell reaction at fuel cell restart by performing a purging process to drive out any air present within the fuel electrode 2 with nitrogen or other inert gas before feeding the fuel thereinto.

When the fuel is fed into the fuel cell 1, the fuel electrode 2 and the oxidant electrode 3 are electrically connected. In the present embodiment, the fuel electrode 2 and the oxidant electrode 3 are connected via the internal resistive load 21 at first by operating the switch 23. If the fuel cell power generating system is of a single cell type, the two electrodes 2, 3 of the fuel cell 1 are simply connected via the resistive load 21. If the fuel cell power generating system is of a stack type in which a plurality of fuel cells 1 are stacked together, the two electrodes 2, 3 of the fuel cells 1 may be connected via the resistive load 21 in various forms. For example, the two electrodes 2, 3 of each single fuel cell 1 or opposite ends of the fuel cell stack (i.e., the electrodes 2, 3 of the outermost fuel cells 1) may be connected via the resistive load 21. Alternatively, the fuel cell stack may be configured such that the fuel cells 1 are divided into a plurality of fuel cell groups and opposite ends (electrodes 2, 3) of each fuel cell group are connected via the resistive load 21. When the two opposite electrodes 2, 3 are electrically connected, there is formed a concentration cell (multiple concentration cells in the case of the stack type) due to a difference in hydrogen concentration in the fuel electrode 2 and the oxidant electrode 3 and, as a consequence, hydrogen migrates from the fuel electrode 2 to the oxidant electrode 3 as a result of reactions expressed by chemical equations (3) and (4) below. Electrons ($e^-$) released from hydrogen molecules move from the fuel electrode 2 through the resistive load 21 to the oxidant electrode 3.

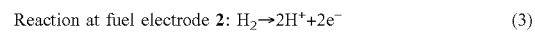

Reaction at fuel electrode 2: $H_2 \rightarrow 2H^+ + 2e^-$ (3)

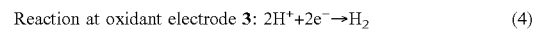

Reaction at oxidant electrode 3: $2H^+ + 2e^- \rightarrow H_2$ (4)

If air is retained within the oxidant electrode 3 prior to system startup, the reaction expressed by the earlier-mentioned chemical equation (1), or the oxygen reduction reaction ($\tfrac{1}{2}O_2 + 2H^+ + 2e^- \rightarrow H_2O$), first occurs and, then, the reaction expressed by chemical equation (4) above takes place. As a result, a hydrogen-rich atmosphere is created at both the fuel electrode 2 and the oxidant electrode 3. During the aforementioned process, a potential difference of about 0.1 V is maintained between the two electrodes 2, 3. The smaller the potential difference between the two electrodes 2, 3, the greater the reducing power and the more efficiently the oxidized catalyst can be reduced. Since absolute potential of the fuel electrode 2 is approximately 0 V, absolute potential of the oxidant electrode 3 is maintained at 0.1 V or less (where the absolute potential is defined as the electrode potential when oxidation reduction potential of hydrogen is assumed to be 0 V). In a case where the process of reducing oxide deposits on the catalyst by feeding the fuel to the fuel electrode and air to the oxidant electrode is to be carried out as described in the earlier-mentioned non-patent document and Japanese Patent Application Publication, it is necessary to flow a larger current than under normal operating conditions and, if the rate of fuel supply is inadequate, a shortage of fuel will occur. Although the oxidant removes electrons from the fuel while the fuel is supplied in adequate quantities, the oxidant also deprives the catalyst of electrons under fuel shortage conditions, thereby causing oxidation of the catalyst on the fuel electrode, because a sufficient amount of electrons can not be taken from the fuel alone.

Whereas the reduction process of the aforementioned documents has a lot of disadvantages, such as a tendency to accelerate corrosion by oxidation of the catalyst on the fuel electrode, the aforementioned process of the embodiment makes it possible to create a hydrogen-rich atmosphere at the oxidant electrode with by far a small amount of current. In addition, the present embodiment provides such an advantage that abnormal corrosion of the fuel electrode 2 does not occur even if the rate of fuel supply is insufficient, because no oxidant is present at the oxidant electrode 3 on the opposite side at this point, for example.

The rate of fuel supply necessary for reducing oxide deposits on the catalyst is determined based on Faraday's laws of electrolysis by using the aforementioned chemical equations (3), (4) and the amount of current flowing between the two electrodes 2, 3, where the amount of current varies with the voltage between the two electrodes 2, 3 and the resistance value of the resistive load 21 according to Ohm's law.

A greater effect of reducing the oxide deposits on the catalyst would be obtained by lengthening the period of time during which the oxidant electrode 3 is maintained at 0.1 V or less (or the period of time during which the oxide deposits on the oxidant electrode 3 are reduced) with the two electrodes 2, 3 interconnected. This period of time should preferably be as short as possible, however, because an excessive oxide reduction time will result in a waste of the fuel. The relationship between the period of time during which the oxidant electrode 3 is maintained at 0.1 V or less and oxide-reducing effects obtained will be later described with reference to specific examples.

After the oxides deposited on the oxidant electrode 3 are removed by the aforementioned reduction process performed with the two electrodes 2, 3 interconnected, the oxidant inlet valve 13 and the oxidant outlet valve 14 are opened to supply the oxidant to the oxidant electrode 3.

The oxidant used in the fuel cell power generating system of the embodiment is a fluid (e.g., air) containing a substance which can oxidize the fuel. The oxidant may be supplied with the electrodes 2, 3 connected or with the electrodes 2, 3 disconnected. If the electrodes 2, 3 are kept interconnected at this point in time, the oxidant supplied to the oxidant electrode 3 induces electrochemical reaction. Energy generated by the reaction is mostly converted into electric energy, which is released from a load (i.e., the resistive load 21 or the external load 22) in an external circuit in the form of heat or work. Since the heat or work is released from the load in the external circuit in this fashion, the amount of heat released from a surface of the catalyst is expected to decrease. If the electrodes 2, 3 are not connected to each other, on the other hand, the oxidant supplied to the oxidant electrode 3 produces a chemical reaction on the surface of the catalyst on the oxidant electrode 3 and resultant energy is released from the surface of the catalyst on the oxidant electrode 3 in the form of heat. This kind of heat generation at the catalyst surface may potentially cause thermal degradation of the catalyst and a nearby portion of the electrolytic layer 4. Thus, when the oxidant is supplied with the two electrodes 2, 3 disconnected from each other, the fuel present within the oxidant electrode 3 should preferably be purged beforehand by flowing nitrogen or other inert gas to decrease the risk of catalyst degradation. Needless to say, the fuel within the oxidant electrode 3 may be purged beforehand even when the electrodes 2, 3 are interconnected. If the fuel cell power generating system is the stack type (not the single cell type) and the rate of fuel supply varies from one cell to another, however, polarities of the electrodes 2, 3 of one or more fuel cells 1 in which the rate of fuel supply is low may potentially be reversed due to a fuel shortage when the oxidant is supplied with the two opposite electrodes 2, 3 of the stack interconnected. It is therefore necessary to carefully regulate flow rates of the fuel and the oxidant to prevent the occurrence of such a situation.

When the flow rate of the oxidant has stabilized after beginning to supply the oxidant, the fuel cell 1 is switched from the resistive load 21 to the external load 22 by operating the switch 23 to quit startup phase operation and transfer to normal operation.

According to the preferred embodiment of the invention thus far described, oxides deposited on the oxidant electrode 3 are removed by the reduction process performed by supplying the fuel to the fuel electrode 2 with the fuel electrode 2 and the oxidant electrode 3 interconnected and, then, the oxidant is supplied to the oxidant electrode 3 and the fuel cell power generating system is switched to begin normal operation. It is possible to reduce the oxides deposited on the oxidant electrode 3 and restore normal performance of the fuel cell 1 in a simple and inexpensive way by the aforementioned reduction process.

Although the fuel electrode 2 and the oxidant electrode 3 are interconnected via the resistive load 21 in the foregoing embodiment of the invention, the two electrodes 2, 3 may be connected via the external load 22 (power conditioner), which is typically used during normal operation, instead of the resistive load 21 and operate the fuel cell power generating system while restricting the amount of current flowed through and voltage applied to the external load 22.

While the oxides deposited on the oxidant electrode 3 are reduced by connecting the two electrodes 2, 3 in the preferred embodiment of the invention, the embodiment may be so modified as to maintain the absolute potential of the oxidant electrode 3 at 0.1 V or less by an alternative configuration. One possible approach would be to directly supply the fuel, such as hydrogen, to the oxidant electrode 3. This approach however entails complication of the system configuration due to the need for a separate piping and valves for feeding the fuel to the oxidant electrode 3. In addition, this approach involves some difficult problems, such as the fact that it is not so easy to precisely control such fuel supply-related parameters as pressure and flow rate compared to controlling electrical parameters, such as voltage and current. Thus, it is appreciated that the configuration of the embodiment which allows electrical control is advantageous over the aforementioned alternative configuration.

Furthermore, although the oxides deposited on the oxidant electrode 3 are reduced by connecting the two electrodes 2, 3 at startup of the fuel cell power generating system in the preferred embodiment of the invention, the oxidant electrode reduction process may be performed when stopping the fuel cell power generating system. If the fuel cell power generating system is not operated for an extended period of time, however, external air may intrude into the interior of the fuel cell 1 and oxygen contained in the air may oxidize the two electrodes 2, 3. If the reduction process is performed only when stopping the fuel cell power generating system, it is not possible to reduce the catalyst oxidized while the fuel cell power generating system is not operated, so that a sufficient voltage may not be produced by the fuel cell 1 at system restart. If the reduction process is performed at system restart, however, the fuel cell 1 can deliver a sufficient voltage after the system restart because the catalyst oxidized during a preceding cycle of operation and during non-operating conditions is fully reduced by the reduction process.

EXAMPLES

Table 1 shows the results of experiments conducted to evaluate the fuel cell performance in terms of voltage drop ratio per operating cycle observed when the fuel cell power generating system of the invention was repeatedly run and stopped 100 times with varying durations of startup phase operation (during which the potential difference between the two electrodes 2, 3 was maintained at 0.1 V or less with the two electrodes 2, 3 interconnected). Referring to Table 1, the duration of the startup phase operation was 1 minute or more in Example 1, 10 seconds or more in Example 2, 1 second or more in Example 3, less than 1 second (approximately 0.5 second) in Comparative Example 1, and 0 seconds in Comparative Example 2. The experimental results indicate that the voltage drop ratio was the lowest in Example 1 and relatively low in Examples 2 and 3, whereas Comparative Example 2 (in which the startup phase operation was not performed) exhibited a maximum voltage drop ratio. While the aforementioned startup phase operation was performed in Comparative Example 1, the effect of lowering the voltage drop ratio was not so appreciably great in Comparative Example 1 as in Examples 1 through 3. This is presumably because the surface of the catalyst on the oxidant electrode 3 was not reduced due to an insufficient period of time of exposure to a reducing atmosphere and the oxidized catalyst surface was not completely reconditioned, making it impossible to restore a normal cell voltage.

TABLE 1

| | Example 1 | Example 2 | Example 3 | Comparative Example 1 | Comparative Example 1 |
|---|---|---|---|---|---|
| Voltage drop ratio (mV/cycle) | 0.025 | 0.032 | 0.046 | 0.083 | 0.121 |

What is claimed is:

1. A method of operating a fuel cell having a fuel electrode to which a fuel is supplied, an oxidant electrode to which an oxidant is supplied, a layer of an electrolyte having hydrogen ion conductivity sandwiched between the fuel electrode and the oxidant electrode, a fuel channel for supplying the fuel to the fuel electrode, and an oxidant channel for supplying the oxidant to the oxidant electrode, the method comprising:

supplying the fuel to the fuel electrode with the fuel electrode and the oxidant electrode electrically interconnected to produce hydrogen at the oxidant electrode by provoking electrochemical reactions expressed by the chemical equations $H_2 \rightarrow 2H^+ + 2e^-$ and $2H^+ + 2e^- \rightarrow H_2$ at the fuel electrode and the oxidant electrode, respectively, producing an oxidant electrode reduction process using the hydrogen produced at the oxidant electrode, and thereby reducing oxides deposited on the oxidant electrode, at a startup operation, from a non-operating condition; and then supplying the oxidant to the oxidant electrode to begin continuing operation of the fuel cell after the startup operation.

2. The method of operating a fuel cell according to claim 1, wherein potential difference between the fuel electrode and the oxidant electrode is maintained at no more than 0.1 V during the oxidant electrode reduction process.

3. The method of operating a fuel cell according to claim 2, including performing the oxidant electrode reduction proces for at least 1 second.

4. The method of operating a fuel cell according to claim 1, including purging a fluid from within the fuel channel by flowing an inert fluid through the fuel channel before beginning the oxidant electrode reduction process.

5. The method of operating a fuel cell according to claim 1, including purging a fluid from within the fuel channel by flowing an inert fluid through the fuel channel before beginning the continuing operation, upon producing the oxidant electrode reduction process.

6. The method of operating a fuel cell according to claim 1, including supplying the oxidant to the oxidant electrode with the fuel electrode and the oxidant electrode electrically interconnected.

* * * * *